(12) United States Patent
Ehrlich

(10) Patent No.: US 8,375,656 B2
(45) Date of Patent: Feb. 19, 2013

(54) INSULATING SHEET AND REFRIGERATED TRAILER COMPONENTS FORMED FROM SAME

(75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 59 days.

(21) Appl. No.: 11/943,022

(22) Filed: Nov. 20, 2007

(65) Prior Publication Data

US 2008/0118723 A1  May 22, 2008

Related U.S. Application Data

(60) Provisional application No. 60/866,728, filed on Nov. 21, 2006.

(51) Int. Cl.
*B32B 7/02* (2006.01)

(52) U.S. Cl. ............. 52/177; 428/98; 428/105; 428/114; 428/221

(58) Field of Classification Search .................... 52/177; 428/105, 98, 114, 221
See application file for complete search history.

(56) References Cited

U.S. PATENT DOCUMENTS

| | | | |
|---|---|---|---|
| 3,726,751 A | | 4/1973 | Casadevall |
| 3,959,544 A | * | 5/1976 | Rogers .......................... 428/109 |
| 4,009,067 A | | 2/1977 | Rogers |
| 4,416,175 A | | 11/1983 | Bettner |
| 5,928,735 A | * | 7/1999 | Padmanabhan et al. ........ 428/33 |

OTHER PUBLICATIONS

Letter from Mexican Patent Counsel dated Nov. 10, 2011, 2 pages, and second Mexican Office Action from the IMPI (No. de Folio: 81156) for Mexican Patent Application No. MX/a/2007/014541, 3 pages.

Mexican Patent Counsel Letter Dated Apr. 7, 2011, 4 P. and First Mexican Office Action From the IMPI (No. De Folio: 11876) for Mexican Patent Application No. MX/a/2007-/014541, 4 P.

Mexican Patent Counsel Letter Dated Jul. 25, 2012, 3 P. and Third Mexican Office Action From IMPI (No. De Folio: 50759) for Mexican Patent Application No. MX/a/2007/014541, 4 P.

* cited by examiner

*Primary Examiner* — Brent O'Hern

(57) ABSTRACT

A reinforcement sheet is formed from plurality of tape layers. Each tape layer includes unidirectional fibers held together by thermoplastic resin. The layers are fused together to form a reinforcement sheet. Because the sheet is formed without weaving, pinholes in the sheet are eliminated. As no stitching is required, the sheet can be efficiently manufactured. The sheet can be used in a variety of applications including a subpan, roof or side wall of a refrigerated trailer.

4 Claims, 4 Drawing Sheets

INSULATING SHEET AND REFRIGERATED TRAILER COMPONENTS FORMED FROM SAME

This application claims the domestic benefit of U.S. Provisional Application Ser. No. 60/866,728 filed on Nov. 21, 2006, which disclosure is hereby incorporated by reference.

FIELD OF INVENTION

This invention relates to an insulating sheet and components of a refrigerated trailer formed from the insulating sheet.

BACKGROUND OF THE INVENTION

FIG. 1 illustrates a prior art refrigerated trailer 20. The trailer 20 includes a body formed from a pair of rectangular sidewalls 22, a front wall 26 and, rear doors (not shown) which extend upwardly from a floor structure 28, and a roof structure 30. The front wall 26 has a cooling unit 27 provided thereon in a conventional manner. The rear portion of the floor structure 28 is supported by a conventional rear undercarriage assembly 29. The front portion of the floor structure 28 has a conventional landing gear 34 secured thereunder. The roof structure 30 and an upper portion of each sidewall 22 is secured to a respective top rail 35 in a conventional manner. The floor structure 28 and a lower portion of each sidewall 22 is secured to a respective bottom rail 49 in a conventional manner. The top and bottom rails 35, 49 are made of a suitable material such as aluminum. The trailer 20 can be connected to a tractor by conventional means, such as a fifth wheel assembly.

As shown in FIG. 2, the sidewalls 22 are formed in a conventional manner. While one embodiment of a prior art sidewalls 22 is shown, this is not limiting and there are other embodiments known in the prior art. As shown, each sidewall 22 has an inner thin skin 43, an outer thin skin 47, and at least one "Z" shaped post 46 therebetween. The inner and outer skins 43, 47 are preferably made of fiberglass and aluminum, respectively, but can be any combination. Each post 46 is integrally formed of suitable structural material, such as aluminum or fiberglass polyester pultrusion. The posts 46 are generally mounted between the inner and outer skins 43, 47 of the sidewalls 22 and are spaced apart from each other along the length of each sidewall 22. When assembled, the inner skin 43 is spaced from the post 46 such that a cavity is formed. A generally L-shaped seal 69 is provided at the bottom of the cavity to separate the sidewall 22 from the floor structure 28. A foam is poured or injected between the inner skin 43 and the outer skin 47 to provide a foam core 48, to complete construction of the side wall 22. With the foam core 48 in place, the inner skin 43 is bonded to the post 46.

Each bottom rail 49 extends the length of the respective sidewall 22 and is connected to the sidewall 22 in a known manner. Each bottom rail 49 has a vertical portion 60 and a horizontal portion 62 at approximately a midpoint thereof which separates the vertical portion 60 into an upper vertical portion and a lower vertical portion. A generally Z-shaped member 51 is seated against the underside of the horizontal portion 62. The member 51 is formed of extruded aluminum and extends along the length of each bottom rail 49. Each member 51 has a horizontal upper leg 64 which is secured to the underside of the horizontal portion 62, a vertical intermediate leg 66 which extends downwardly from the upper leg 64, and a horizontal lower leg 68 which extends inwardly toward the interior of the trailer 20 from the lower end of the vertical intermediate leg 66.

The floor structure 28 includes floor material 44, which may be formed of, for example, aluminum or wood planks, raised up off structural floor supporting beams or crossmembers 45 by insertion of structural thermal risers 50 between the floor material 44 and the crossmembers 45. The risers 50 generally align with the crossmembers 45. Each end of the crossmembers 45 has an end clip 52 that is connected to the lower vertical portion of the respective bottom rail 49 by suitable means, such as rivets or bolts. A plurality of the cross-members 45 are provided at spaced apart locations along the bottom rail 49. Each cross-member 45 is integrally formed from a conventionally formed I-beam. A barrier sheet or subpan 41 is sandwiched between the crossmembers 45 and the floor risers 50. The space between the floor material 44 and the subpan 41 creates a cavity in which the core 25, formed from an insulating material, such as urethane foam, can be poured or injected to fill the cavity.

The subpan 41 is formed of a flat sheet of material which is seated onto the upper surface of the horizontal lower leg 68. When the core 25 is foamed into place, the pressure from the foam seals the subpan 41 against the horizontal lower leg 68. Therefore, no fastening means are required. Fastening means can, however, be provided.

Various sheet materials have been employed as a refrigerated trailer subpans through the years. Early designs were steel that was heavy and rusted badly. In the 1960's aluminum was substituted for steel but galvanic corrosion at the steel structural floor support was not much of an improvement. Later, a polyester fiberglass reinforced plastic sheet (FRP) became the most popular material as it could be made light weight, strong and corrosion free.

Around year 2000, a new process was created for forming a woven FRP 70 (see FIGS. 3A and 3B). In this new process, glass fibers were impregnated with a thermoplastic resin. The resin and glass fibers were simultaneously produced and then co-mingled into a roving 71. Multiple rovings 71 were then woven into a cloth and as a result, the glass fibers extended in both the X and Y directions. Heat and pressure were applied to the cloth to melt the thermoplastic resin fibers, fusing the glass fibers together. Cooling the hot sheet under pressure produced a woven FRP sheet 70 that was very strong and light weight. Because the glass fibers are interlocked as a result of the weaving, the bundles of fibers (strand) cannot pull out of the consolidated sheet 70. The thermoplastic FRP sheet 70 is tough and proved to be superior to the polyester sheet which was brittle. Therefore, the more efficient woven thermoplastic FRP sheet 70 became the standard in many applications. This thermoplastic FRP sheet 70 still, however, had a basic problem. Pin holes 33 would develop in the consolidated sheet 70 at the intersection of the rovings in the weave, see FIG. 3A. A thin FRP sheet (not shown) was added to prevent the pinhole problem. This made the product less cost efficient but the woven resin sheet was still superior to the polyester sheet. Alternatively, extra resin and fibers were added to fill the pin holes 33. This form of reinforcement is very strong and energy absorbing, but it is also expensive. In the woven thermoplastic FRP sheet 70 shown in FIGS. 3A and 3B, the fibers weave back and forth in the woven cloth. When the woven FRP sheet 70 is stressed, the fibers tend to straighten before stressing takes place. This form of reinforcement tends to be more flexible, but increases its energy absorption impact properties.

Another prior art configuration using FRP is shown in FIGS. 4A and 4B. This configuration uses random chopped fibers 34 to form the sheet 80. The fibers 34 are completely randomly place, similar to a compressed stack of hay.

Due to the ease of processing the sheet 80 and due to the fact that this is one of the most cost effective methods of reinforcing the resin available, reinforcements of this type have been very popular. Reinforcements of this type, however, tend to be less efficient at reinforcing the resin. The woven thermoplastic FRP sheet 70 shown in FIGS. 3A and 3B presents several advantages over the sheet 80 of FIGS. 4A and 4B. As a result of weaving the reinforcing fibers, the tear resistance and strength properties are improved over the sheet 80. Bundles of parallel fibers that have been locked in place by the weave work together, as opposed to the random chopped fibers which are oriented in all directions. However, the cost of weaving is significant and woven cloth has to be sized and inventoried for the application or considerable waste will occur.

To eliminate weaving costs, various methods of non-woven unidirectional fiber reinforcements have been used. For example, stitching or sewing parallel fibers eliminates weaving, The non-woven parallel fibers in place so they can be handled like the woven fiber cloth. Multiple layers of the stitched fibers are layered and then stitched together to produce a cloth with fiber reinforcement in various directions. The stitched cloth fibers stay in place while they are saturated with a liquid resin.

The present invention provides a reinforcement sheet which overcomes the problems presented in the prior art and which provides additional advantages over the prior art, such advantages will become clear upon a reading of the attached specification in combination with a study of the drawings.

SUMMARY OF THE INVENTION

Briefly, the present invention discloses a reinforced sheet which is formed from a plurality of tapes having unidirectional fibers. No stitching or weaving is required to form the reinforced sheet. The reinforced sheet is ideal for forming a subpan for a refrigerated trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
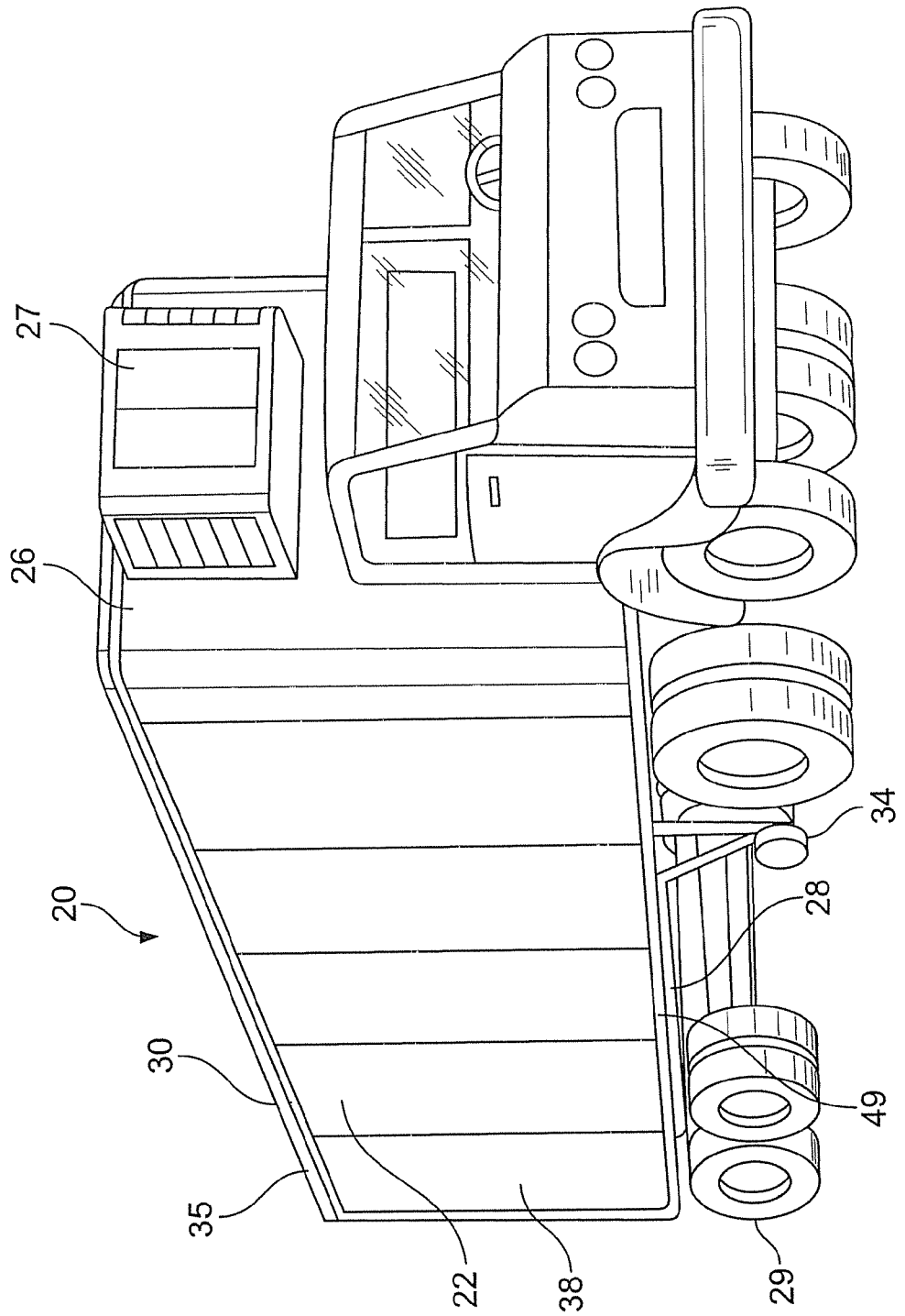
FIG. 1 is a perspective view of a refrigerated trailer of the prior art.
Figure 2:
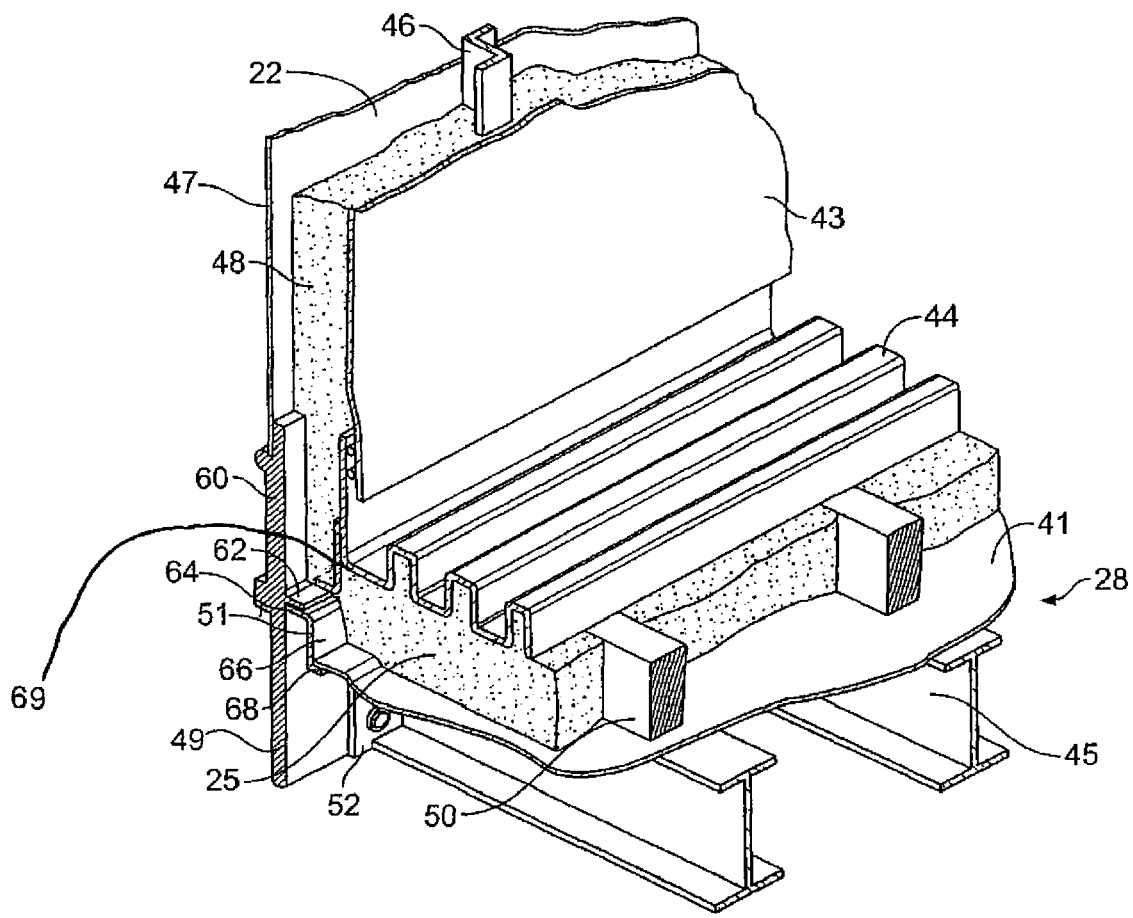
FIG. 2 is a perspective view of the floor and sidewall assemblies of a refrigerated trailer of the prior art.
Figure 3A:
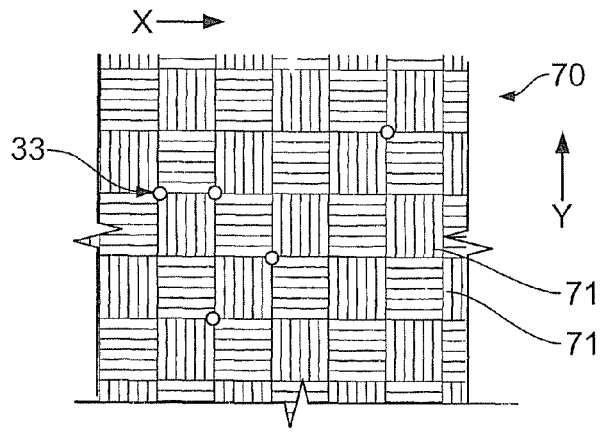
FIG. 3A is an elevated view of a prior art reinforcement sheet.
Figure 3B:
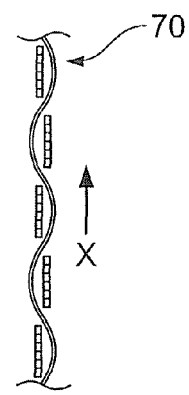
FIG. 3B is a cross-sectional view of the reinforcement sheet of FIG. 3A.
Figure 4A:
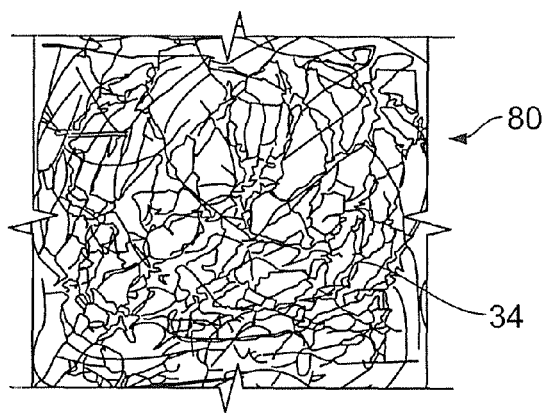
FIG. 4A is an elevated view of a prior art reinforcement sheet.
Figure 4B:
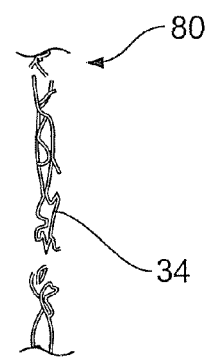
FIG. 4B is a cross-sectional view of the reinforcement sheet of FIG. 4A.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 5A:
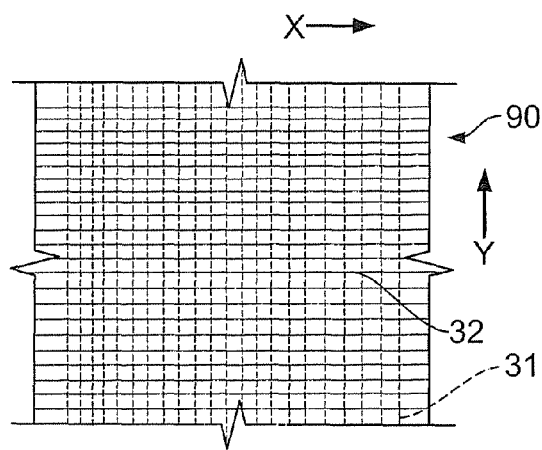
FIG. 5A is an elevated view of the reinforcement sheet of the present invention.
Figure 5B:
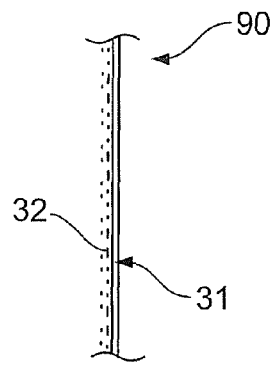
FIG. 5B is a cross-sectional view of the reinforcement sheet of FIG. 5A.

FIGS. 5A and 5B illustrate an embodiment of the reinforcement sheet 90 of the present invention. As shown, the sheet 90 includes layers of reinforced thermoplastic tapes 31, 32. The thermoplastic tape 31 is formed of unidirectional fibers held together by a thermoplastic resin. The thermal plastic tape 32 is also formed of unidirectional fibers held together by a thermoplastic resin. The tapes 31, 32 are positioned over one another and are consolidated to form the reinforced sheet 90. Consolidation is accomplished by heating and pressing the tapes 31, 32 to cause the thermoplastic resin of tape 31 to fuse together with the thermoplastic resin of tape 32. The tape 31 can be positioned at any desired angle relative to the tape 32 to form the FRP sheet 90. As shown, the fibers of tape 31 are positioned in the vertical or Y direction and the fibers of tape 32 are positioned in the horizontal or X direction. Thus, in the embodiment shown the tapes 31 and 32 are perpendicular to one another such that the fibers in tape 31 run transverse to the fibers in tape 32. Each tape 31, 32 is extremely flat and has very uniform fiber distribution. As the fibers are under tension when consolidated and held in place by the consolidating resin, when the two tapes 31, 32 are layered and consolidated, the resulting FRP sheet 90 is extremely thin, lightweight, smooth, strong, and pin hole free. The straight and pre-tensioned fiber strands become rapidly stressed when the FRP sheet 90 is flexed, making the sheet 90 stiff. The reinforced sheet 90 is ideal for forming a subpan for use in a refrigerated trailer.

Several advantages are realized in forming the sheet 90 in accordance with the present invention. First, there is no need to weave or stitch the fibers because the thermoplastic resin holds the fibers in place. Therefore, problems associated with the weaving and stitching processes such as cost and pinhole development are eliminated. Second, fiber placement can be easily controlled in the X direction as well as the Y direction and, therefore, the strength in each direction can be tailored for a specific application. For example, for a specific subpan application, more fibers can be provided in the major direction of the trailer (front to back) than in the in minor direction (side to side), without sacrificing integrity of the resulting sheet 90. Thus, the density of the fibers of the first tape, such as of tape 31 which may be used to form a subpan, may be greater than a density of the fibers of the second tape, such as tape 32 which may also be used to form the same subpan. Third, the fiber content can be varied in each direction, for example, X or Y, independently and will result in a sheet 90 having different directional strength properties.

Figure 6:
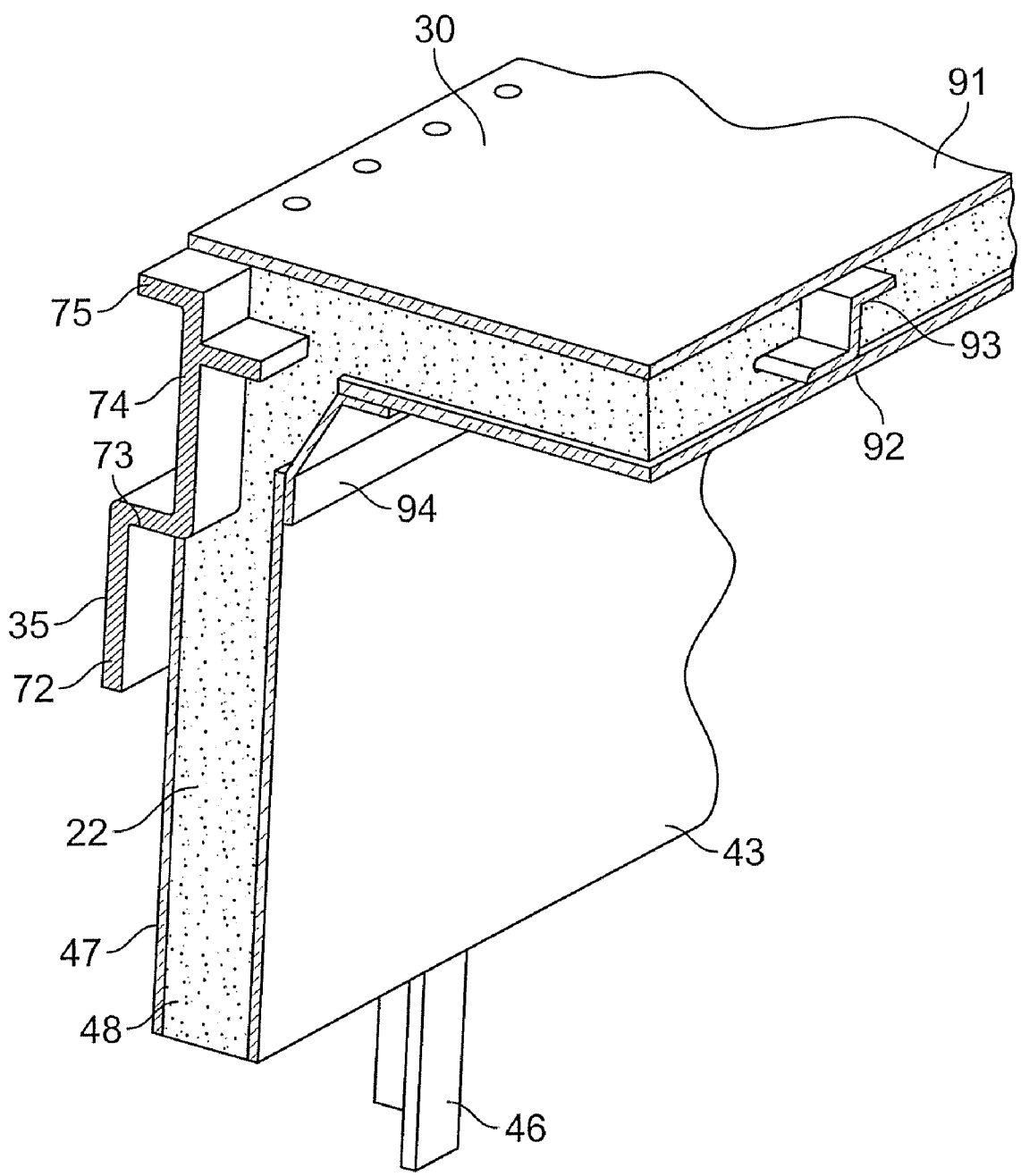
FIG. 6 is a cross-sectional view of a portion of a prior art roof and side wall structure of a trailer.

The reinforced sheet 90 has been shown and described in connection with use as a subpan, however, other uses of the sheet 90 can be made. The reinforced sheet 90 can, for example, be used to form the inner skin 43 of the side wall 22 of the trailer. The reinforced sheet can also be used to form portions of the roof structure 30 as shown in FIG. 6.

The roof structure includes an inner roof sheet or skin 92, an outer roof sheet or skin 91 spaced from the inner roof sheet, and at least one "Z" shaped post 93 therebetween. The posts 93 are generally mounted between the outer and inner skins 91, 92 and are spaced apart from each other along the length of the roof 30. When assembled, the inner roof sheet 92 is spaced from the post 93.

The top rail 35 is formed from a first vertical wall 72, a second wall 73 which is perpendicular to the first vertical wall 72, a third wall 74 which is perpendicular to the second wall 73 and parallel to the to the first wall 72, and a fourth wall 75 which is perpendicular to the third wall 74 and parallel to the second wall 73. The second wall 73 extends inwardly toward the interior of the trailer. A flange extends inwardly from the third wall 74 toward the interior of the trailer. The flange is perpendicular to the third wall 74. The fourth wall 75 extends outwardly from the interior of the trailer. The fourth wall 75 has a plurality of spaced apart apertures provided therethrough for acceptance of rivets which pass through the roof structure 30.

The top rail 35 provides connection between the side wall 22 of the trailer and the roof structure 30. An upper portion of the outer skin 47 of the side wall 22 abuts the inner surface of the first wall 72 of the top rail 35. A portion of the lower surface of the outer roof sheet 91 abuts the upper surface of the fourth wall 75 of the top rail 35. A corner rail 94 extends from the inner skin 43 of the side wall 22 to the inner roof sheet 91 of the roof structure 30. A cavity is defined by the outer and inner skins 91, 92 of the roof structure, the inner and outer skins 43, 47 of the side wall 22, the side rail 35 and the corner rail 94 and foam is poured or injected in the cavity.

The reinforced sheet 90 can be used to form the outer roof sheet 91 or the inner roof sheet 93. Alternatively, the reinforced sheet 90 can be used to form the outer and inner roof sheets 91, 93.

Finally, it is to be understood that sheet 90 can include any number of layers 31, 32 desired and is not limited to a sheet including two layers as shown in FIGS. 5A and 5B.

While preferred embodiments of the present invention are shown and described, it is envisioned that those skilled in the art may devise various modifications of the present invention without departing from the spirit and scope of the appended claims.

The invention claimed is:
1. A trailer floor structure comprising:
a plurality of floor supporting beams;
a subpan positioned over said floor supporting beams comprising a first tape having a plurality of pretensioned unidirectional fibers wherein the positions of said fibers are only maintained by resin, a second tape having a plurality of pretensioned unidirectional fibers wherein the positions of said fibers are only maintained by resin, and wherein said first tape is positioned over said second tape, said fibers of said first tape are angled relative to said fibers of said second tape, and said first tape is fused to said second tape;
a plurality of risers aligned with said supporting beams and positioned on top of said subpan;
a floor material positioned on top of said risers; and
a cavity between said floor material and said subpan, wherein a density of the fibers of the first tape of the subpan is greater than a density of the fibers of the second tape of the subpan.

2. A trailer floor structure as defined in claim 1, wherein the angle between the fibers of said first and second tapes of said subpan is ninety degrees.

3. A trailer floor structure as defined in claim 1, wherein a content of said plurality of fibers of the first tape is the same as a content of said plurality of fibers of said second tape.

4. A trailer floor structure comprising:
a plurality of supporting beams;
a subpan positioned over said floor supporting beams comprising a first tape having a plurality of unidirectional fibers whereinteh positions of said fibers are only maintained by resin, a second tape having a plurality of unidirectional fibers wherein the psitions of said fibers are only maintained by resin, and wherein said first tape is positioned over said second tape, said fibers of said first tape are angled relative to said fibers of said second tape, and said first tape is fused to said second tape;
a plurality of risers aligned with said supporting beams and positioned on top of said subpan;
a floor material positioned on top of said risers; and
a cavity between said floor material and said subpan, wherein a density of the fibers of the first tape of the subpan is greater than an density of the fibers of the second tape of the subpan.

* * * * *